United States Patent [19]

Clemens

[11] Patent Number: 4,836,899
[45] Date of Patent: Jun. 6, 1989

[54] METHOD FOR FIELD-ASSISTED ION EXCHANGE WITH ANODIC AND CATHODIC CONTACTING

[75] Inventor: Peter Clemens, Munich, Fed. Rep. of Germany

[73] Assignee: Siemens Aktiengesellschaft, Berlin and Munich, Fed. Rep. of Germany

[21] Appl. No.: 228,058

[22] Filed: Aug. 4, 1988

Related U.S. Application Data

[62] Division of Ser. No. 108,914, Oct. 15, 1987, Pat. No. 4,786,391.

[30] Foreign Application Priority Data

Nov. 13, 1986 [DE] Fed. Rep. of Germany ....... 3638752

[51] Int. Cl.⁴ ................................. C25F 5/00
[52] U.S. Cl. ...................... 204/130; 204/247
[58] Field of Search ................................. 204/130, 247

[56] References Cited

U.S. PATENT DOCUMENTS 3,218,220 11/1965 Weber ............................ 204/130 X
3,486,995 12/1969 Evers .................... 204/130
3,687,649 8/1972 Bourgeaux ...................... 204/130 X
3,741,741 6/1973 Ohsato ............................ 204/130 X

OTHER PUBLICATIONS

Lilienhof et al., "Printed Geodesic Lenses in Glass with Ion-Exchanged Film Waveguides", *Electronics Letters,* vol. 18, No. 8, Apr. 15, 1982, pp. 344–345.

Holscher et al., "Fabrication of Monomode Ring Coupler by Field Enhanced K+-ion-exchange in BK7 Glass", pp. 1–5.

*Primary Examiner*—Donald R. Valentine
*Attorney, Agent, or Firm*—Hill, Van Santen, Steadman & Simpson

[57] ABSTRACT

An arrangement for mounting a glass member for a field-assisted ion exchange utilizing anodic and cathodic contacting by molten salts characterized by the glass member being arranged between two salt melt vessels containing the salts, each of the vessels having a contact opening surrounded by a sealing lip or surface for engaging a surface of the member as the member is interposed between the two openings and each of the vessels having an arrangement for evacuation of the vessels to form a seal between the sealing lip and the surface of the member. An embodiment of the invention includes a device for changing the level of the molten salts, either by dipping electrodes therein or by rotating the vessels so that the contact openings may be submerged in the molten salt or be above the liquid salt to allow a removing and changing of the glass members being processed.

1 Claim, 4 Drawing Sheets

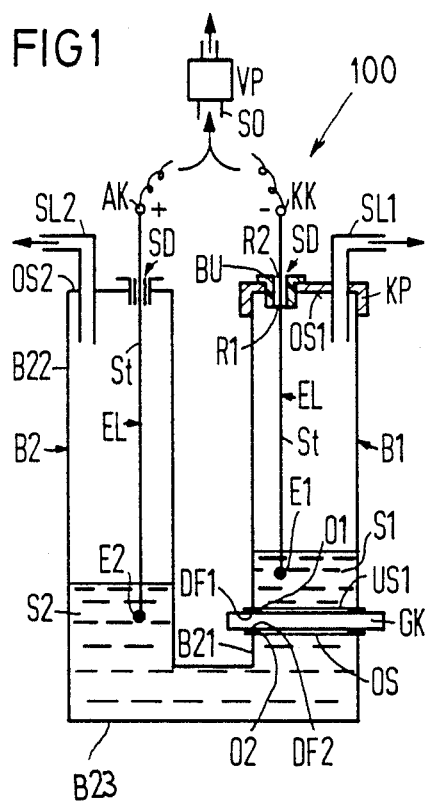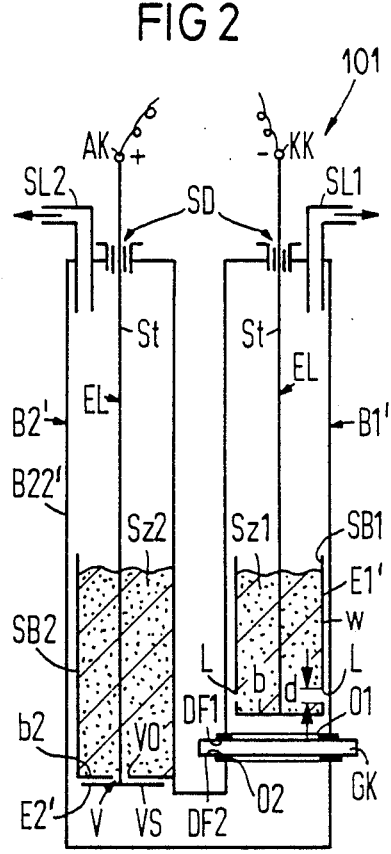

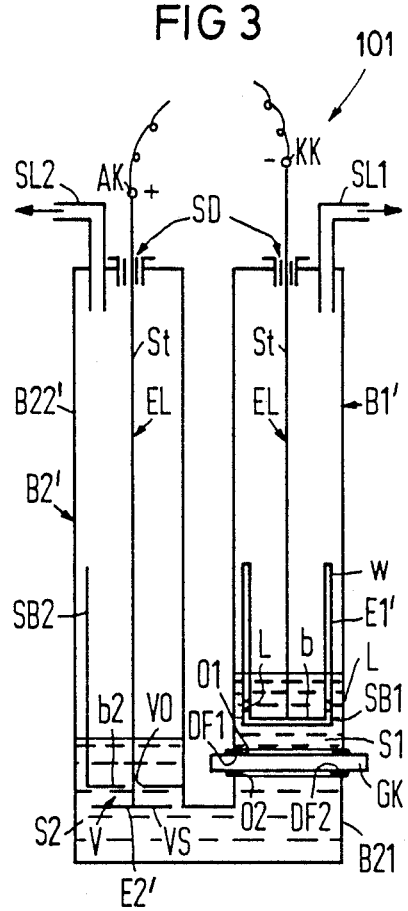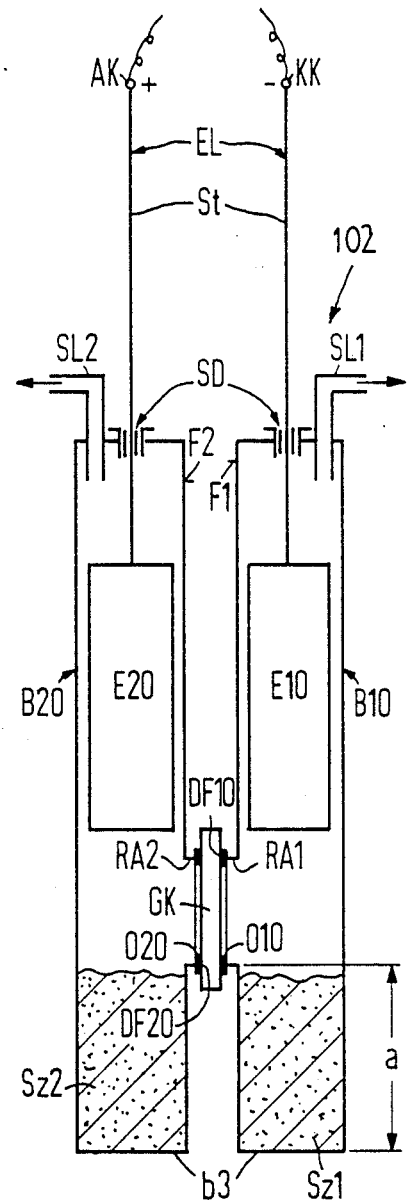

METHOD FOR FIELD-ASSISTED ION EXCHANGE WITH ANODIC AND CATHODIC CONTACTING

This is a division of application Ser. No. 108,914, filed Oct. 15, 1987, now U.S. Pat. No. 4,786,391.

BACKGROUND OF THE INVENTION

The present invention is directed to an arrangement for holding or mounting a glass member for a field-assisted ion exchange with annodic and cathodic contacting by melted salts. The glass member is held between two melted salt vessels, each containing the melted salt which contacts the glass member through contact openings fashioned in the vessels.

An arrangement for contacting a glass member is disclosed in an article from *Electron. Lett.*, Apr. 15, 1982, Volume 18, No. 8. This arrangement serves the purpose of producing a geodetic lens in a glass substrate comprising a film or layer waveguide generated by a field-assisted ion exchange. To that end, the plate-shaped glass substrate, which is locally curved in a molding cycle, has a surface held by suction against the sealing surface on an underside or bottom of an evacuatable cylinder vessel for the one glass melt. The suctioned surface of the glass substrate is in contact with the glass melt in the vessel through to the contact opening, which is surrounded by the sealing surface and simultaneously prevents the melt from flowing out in a downward direction.

The underside of the suctioned glass substrate is brought into contact with the other salt melt by dipping the substrate into this melt. This melt is situated in the other vessel, whose contact opening on its upper surface is of such a size that the glass substrate can be introduced through it into the vessel.

Electrodes are arranged in the two salt melts, and these electrodes are connected by electrical lines to an anode terminal and to a cathode terminal. The electrical line of the evacuatable vessel is conducted into the interior of the vessel from above through a vacuum-tight electrical lead-through.

A similar arrangement is also disclosed in *SPIE*, Vol. 651 "Integrated Optical Circuit Engineering III", 1986, pp. 46–50.

These arrangements, however, are unsuitable or problematical when the contact pressure to be exerted is excessively high for the particular glass member and, for example, leads to a deformation or even destruction of the member. For example, this can be the case given extremely thin, plate-shaped glass members and/or when the ion exchange is to be carried out at a temperature above the transformation temperature $T_g$ (DIN 52 24) of the glass. The relatively high contact pressure, typically 100–1,000 mbar, leads to destruction of the glass member. However, the contact pressure, on the other hand, cannot be selected lower than about 100 mbar, since the sealing surface would otherwise become ineffective and would result in the emergence of the salt melt and in a short-circuit.

SUMMARY OF THE INVENTION

The object of the present invention is to provide an arrangement for holding a glass member for a field-assisted ion exchange with anodic and cathodic contacting by melted salts, which arrangement avoids that the contact pressure affects the whole area of the glass member or even destroying the glass member, particularly, even when the glass member is thin (about 1 mm or less) and/or the ion exchange is carried out above the transformation temperature of the glass member.

To accomplish these goals, the present invention is directed to an improvement in an arrangement for holding a glass member for a field-assisted ion exchange with cathodic and anodic contacting by molten salt melts, wherein the glass member is arranged between two salt melt vessels, each containing its own salt melt, said vessels having contact openings with one of the vessels having a sealing surface or lip being held against the surface of the glass member by suction as the vessel is evacuated. The improvement comprising both salt melt vessels being evacuatable vessels and having sealing surfaces or lips surrounding their openings, said sealing surfaces or rims being held on the surfaces of the glass member by suction.

In accordance with the present invention, the glass member is held on both vessels by suction, wherein both vessels are evacuated by a vacuum.

It has been expedient when, in accordance with the present invention, the sealing surface and contact opening of both vessels are arranged opposite one another. The pressure exerted on the glass member by the sealing surfaces can, thereby, not have bending influence on the glass member, but only a compressing influence. Thus, no pressure or only a slight pressure differential acts on the glass member in the region of the contact opening and this pressure differential is potentially produced by different vacuum pressures in the two vessels.

Such a pressure differential, however, can be avoided to the greatest possible degree when both vessels are connected to a common vaccuum pump or source of vacuum.

A preferred modified embodiment of the arrangement of the present invention is that the plate-shaped member can be horizontally arranged, as herebefore, and the contacting of the underside of the member is assured by a vessel having a first section connected to a second section by a third section with the first section being shorter than the second section and forming the contacting with the glass surface and the melt in the higher second section having a level greater than the height of the first section.

In another preferred embodiment, the plate-shaped members can be vertically arranged and the contacting with the salt occurs from each side. This requires that the level of the salt melt in the vessels lies higher than the contacting opens of the vessel.

An expedient development of an arrangement of the invention is where the salt is melted in the solid form in a container in the vessel and is then deposited into each of the vessels. This is particularly true when at least one of the salt containers has a shut-off valve. The valve is closed until the molten salt in the container reaches the prescribed temperature at which the field-assisted ion exchange is carried out. Then the valve is opened so that the molten salt melt contained in the salt container does not come into contact with the glass member until this point of time. As a result, only the field-assisted ion exchange occurs and a thermic ion exchange, which begins when the melting point of the solid salt is reached, will not occur. Preferably, the shut-off element is formed in a floor of the salt container and is actuatable by a rod extending into the vessel.

The salt container in the salt melt vessel can also be constructed so that it has a plurality of openings which will not pass the unmelted salt, but will allow the melted salt to enter into the salt melt vessel. By combinations of the above, the contacting of the melted salt with the glass member can be controlled.

In another embodiment, the salt is melted in the vessel out of contact with the glass article and the vessel has means for moving the molten salt into contact with the glass article. These means may be electrodes which are submerged into the salt bath to raise the level of the bath so that it is in contact with the glass member. Thus, dipping of electrodes into the salt melt simultaneously brings the melt into contact with the glass member as the electrodes are inserted therein.

In another embodiment, the glass member is positioned between the vessels in a position wherein the salts can be melted while out of contact with the glass member, and then the vessels are tilted or rotated to bring the melted salts into contact with the surfaces of the glass member.

In addition, the invention is directed to a method, wherein after the completion of an ion exchange process on a first glass member, the vessels are acuated to remove the salt baths from contact with a glass member as a subsequent glass member is positioned for a subsequent ion exchange process.

Other advantages and features of the invention will be readily apparent from the following description of the preferred embodiments, the drawings and claims.

BRIEF DESCRIPTION OF THE DRAWINGS

FIG. 1 is a schematic illustration of an embodiment of the salt melt vessel which has one of the salt melt vessels having two sections of unequal height in communication with one another;

FIG. 2 is a schematic illustration of an embodiment of the invention wherein each of the salt melt vessels similar to FIG. 1 contain a salt container, which is filled with a solid salt;

FIG. 3 is a schematic illustration of the embodiment of FIG. 2 after the melting of the solid salt;

FIG. 4 is a schematic illustration of a second embodiment wherein the sealing surfaces and contact openings of both salt melt vessels are constructed on the lateral side walls facing one another and which embodiment uses dipping electrodes which are held above the level of the solid salt filled in each vessel;

DESCRIPTION OF THE PREFERRED EMBODIMENTS

Figure 5:
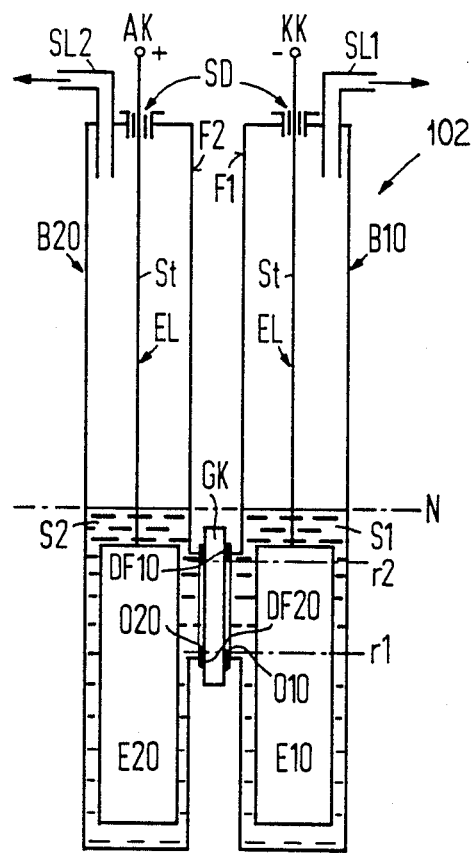
FIG. 5 is a schematic illustration of the device of FIG. 4 after melting of the solid salt and the emersion of the dipping electrodes into this molten salt melt.

The principles of the present invention are particularly useful with an arrangement 100, generally indicated in FIG. 1. The arrangement 100 has a salt melt vessel B1, which is illustrated as being a vertically mounted tube of, for example, silica glass, which has a bottom with a contact opening O1 surrounded by a circular lip or rim which is planarly ground and forms a sealing surface DF1 surrounding the opening. The other salt melt vessel B2 of the arrangement 100 is also formed of silica glass bent U-shaped, which has two upwardly projecting tube legs or section B21 and B22 of unequal height, which are in communication with one another and are interconnected by a third section B23. The end face of an upper edge or surface OS of the smaller or shorter first section B21 is opened on this end to form a contact opening O2. The contact opening O2 is surrounded by an annular lip which is planarly grounded and forms the sealing surface DF2 for the salt melt vessel B2.

One of the salt melt vessels, such as the vessel B1, is terminated vacuum-tight at its upper side OSl and the other salt melt vessel B2 is terminated vacuum-tight in the upper end OS2 of its higher or larger second section B22.

A suction line SL1 projects into the interior of the one salt vessel B1 and a suction line SL2 projects into the interior of the other salt melt vessel B2. The suction lines SL1 and SL2 are connected to a suction opening SO of a shared or common vacuum pump VP.

An electrode E1 is arranged in the interior of the salt melt vessel B1, while an electrode E2 is arranged in the vessel B2. Each of the electrodes E1 and E2 is electrically connected to an allocated contact KK or AK, respectively, which is situated outside of the salt melt vessels B1 and B2. This electrical connection is formed by an electrical line EL, which is conducted to the interior of the given salt melt vessel B1 or B2, respectively, through a vacuum-tight electrical lead-through SD.

In the embodiment illustrated in FIG. 1, every electrical line EL is formed by a movable rod St of metal and the electrical lead-through SD is fashioned as a vacuum-tight sliding lead-through, through which the rod St projects into the interior of the particular salt melt vessel B1 or B2 in an electrically insulated fashion. As a result thereof, the electrodes E1 and E2 in the interior of the salt melt vessels B1 and B2 and, in particular, in the salt melts S1 or, respectively S2, can be dislocated and displaced for favorable adjustment in these vessels.

An example of a vacuum-tight closure is schematically shown in FIG. 1 for the upper end OS1 of the salt melt vessel B1. For example, this closure can be composed of a metallic cover cap KP, which is inverted over the end of the vessel or section and, for example, can be connected to the vessel or section in a vacuum-tight manner utilizing a crimp closure. The suction line, such as SL1, can be conducted into the interior of the given vessel through this cap KP. The electrical lead-through or sliding lead-through SD can also be arranged in this cap KP. For example, it can be composed of a bushing BU of an electrically insulating material which is mounted in an opening in the cap KP. One or two O-rings R1 and R2 of elastic material is arranged in this bushing to sealingly engage a portion of the metal rod St, which is guided through the O-rings. Such a sliding lead-through can be used for all the vessels of the exemplary embodiments shown in FIGS. 1–7 so that this closure and/or this sliding lead-through is shown only schematically for the second section B22 of FIG. 1 and for the salt melt vessels of the remaining Figures.

In each of the embodiments, it is assumed, by way of example, that the contact AK is an anode contact and the contact KK is a cathode contact. During the operation of the arrangement of FIG. 1, a plate-shaped glass member GK is horizontally held between the two finely grounded sealing surfaces DF1 and DF2 of the two evacuated salt melt vessels B1 and B2. The shared vacuum pump VP, which is used for evacuating, insures that the same pressure is present in each of the salt melt vessels B1 and B2. The salt melt S1 contained in the vessel B1 will contact the upper surface of the glass member GK. Since, for achieving a good contact between the salt melt S2 in the other salt melt vessel B2, with the underside of the glass member GK, the level of the salt melt S2 in the higher or second section B22 is placed higher than the level of the upper edge or end OS of the lower or first section B21. This will cause the salt melt S2 to stay in contact with the surface of the glass member GK. The contact pressure at the sealing surfaces DF1 and DF2 must be in a range of 100–1,000 mbar. This pressure, however, now acts only at the location of the sealing surface and not over the entire area of the contact opening as in previous known devices. The field assisted ion exchange can therefore also be carried out above the transformation temperature Tg for the plate-shaped glass member which is polished on both surfaces. In order to achieve the desired contact pressure, a backing pump can be used as the vacuum pump VP.

An embodiment of the arrangement is generally indicated at 101 in FIGS. 2 and 3 and differs from the embodiment 100 in that each of the salt melt vessels B1' and B2' are provided with salt vessels or containers SB1 and SB2, respectively. A second distinction is the structure of the electrodes E1' and E2'. It should be noted that FIG. 2 shows the arrangement 101 in a cold condition, whereas FIG. 3 shows this arrangement when it is in a heated condition. The cup-shaped salt vessel or container SB1 in the one or first salt melt vessel B1' is composed of metal and has a floor b, which is connected to the rod St. Thus, the metal container SB1 simultaneously forms an electrode E1' in this salt melt vessel B1'. The salt container SB1 has holes L, which are formed in a circumferential wall w adjacent the floor b. The holes L have a diameter d of, for example, 2 mm, and the diameter is such that solid salt Sz1 in the salt container SB1 will not pass through the holes while in a cold condition. However, upon heating to a molten or melted state, the salt melt S1 will emerge through the holes L into the vessel B1'.

The salt vessel or container SB2 in the other salt melt vessel B2' is expediently arranged in the higher or second section B22' and has a valve V. The valve V is formed by a valve opening VO in a floor b2, which valve opening VO is closed by a valve closure member VS of the valve V. The valve closure member VS is composed, for example, of metal and is connected to the metal rod St so that it can be optionally moved back and forth from outside for closing and opening the valve V. At the same time, this valve closure member VS forms the electrode E2' of the other or second salt melt vessel B2'. The salt container SB2 can be fixed in the second section B22' and, for example, and can comprise a cross-partition in the second section B22', which forms the vessel floor b2 and which has an opening VO. The second section B22' is potentially of the same material as the cross section.

The filling of salt containers SB1 and SB2 with solid salts Sz1 and Sz2 occurs in the cold condition of the arrangement. Since the salt container SB1 holds back the solid salt Sz1, the sealing surface can engage a surface of the glass member GK without any problems as the suction is applied within the chamber B1'. The filling of this other salt container SB2 with the solid salt Sz2, which contains the exchange ion, occurs given a closed valve V so that the solid salt can, likewise, not emerge from the salt container.

After both salt melt vessels B1' and B2' have been subjected to a vacuum to draw the sealing edges DF1 and DF2 against the surfaces of the glass member GK, the solid salts Sz1 and Sz2 are now melted by heating. The salt melt S1 occurring in the salt container SB1 will flow through the holes L into the salt melt SB1' to contact the glass member SK. The salt melt Sz2 occurring in the other salt container SB2 remains in this vessel because of the closed valve V.

When the prescribed temperature for the field-assisted ion exchange process is reached, the valve V is then opened so that the salt melt S2 emerges into the other salt melt vessel B2' and comes into contact with the glass member GK, as shown in FIG. 3. What is thereby achieved is that the field-assisted ion exchange process is not fundamentally proceeded by a thermic ion exchange process beginning when the melting of the solid salts Sz2 is reached.

Another embodiment of the arrangement is generally indicated at 102 in FIGS. 4 and 5. In this embodiment, two salt melt vessels B10 and B20 are composed of two vertical tubes, for example, made of silica glass which are closed vacuum-tight at the upper and lower ends. The sealing surfaces DF10 and DF20, as well as the contact openings 010 and 020, which are surrounded by the sealing surfaces, are constructed in a vertical or longitudinal extending side or wall F1 and F2 of the tubes which lie opposite one another. To that end, each of the salt melt vessels B10 and B20 comprises a short, opened tube socket RA1 and RA2, respectively, whose finely ground end faces form the sealing surfaces or rims DF10 and DF20, respectively.

The sealing surfaces DF10 and DF20 are arranged at a distance a from a floor b3 of the salt melt vessels B10 and B20 so that a section or portion of each salt melt vessel is below the sealing surfaces. These sections are initially filled with the solid salts Sz1 or Sz2, respectively.

Vertically movable, block-shaped dipping electrodes E10 and E20 are also arranged in the salt melt vessels B10 and B20. These electrodes are connected to contacts KK an AK, respectively, by a vertically movable metal rod such as ST. In this way, these rods also form electrical lines EL for the dip electrodes, and project into the interior of the salt melt vessels through vacuum-tight sliding lead-throughs SD.

After the sections of the two salt melt vessels B10 and B20, which are situated under the sealing surfaces DF10 and DF20 have been filled with the allocated solid salts Sz1 and Sz2, respectively, in the cold condition, the sealing surfaces DF10 and DF20 are firmly sealed against both sides of a plate-shaped and vertically arranged glass member GK by applying suction to each of the vessels B10 and B20. While forming this vacuum seal, the dipping electrodes E10 and E20 are arranged in the withdrawn position illustrated in FIG. 4.

The solid salts Sz1 and Sz2 are melted by heating and the level of the melted salts S1 and S2 remain under the sealing surfaces DF10 and DF20. The lowest portion of each of the sealing surfaces DF10 and DF20 have a lower level r1 (FIG. 5), which is also the lower level of the contact openings 010 and 020.

As soon as the prescribed temperature for the ion exchange process is reached, the two dipped electrodes E10 and E20 are simultaneously dipped into the respective salt baths S1 and S2 so that the level N (FIG. 5) of the salt melts rises. The dipped electrodes E10 and E20 are dimensioned in terms of volume so that the level N rises to such a degree that the molten salt of the salt melt covers the openings 010 and 020 and that the glass member GK comes into contact with the melts on both surfaces. In particular, the eletrodes are dimensioned so that the level N rises above an upper limitation r2 of the contact openings 010 and 020, respectively (FIG. 5). While in this condition illustrated in FIG. 5, the field assisted ion exchange can begin in this way without having any preceding undersirable thermic ion exchange.

After the conclusion of the ion exchange, the two electrodes can be lifted so that the two salt melts S1 and S2 will then retreat or retract into the vessel sections lying under the sealing surfaces DF10 and DF20. After that, the interior of the two evacuated salt melt vessels B10 and B20 can be brought into ambient pressure, for example, to atmospheric pressure, and the glass member GK can be taken from the mount or holder. Since the retracted salt melts S1 and S2 are still available for further ion exchange processes on a subsequent glass member or specimens, the arrangement of 102 of FIGS. 4 and 5 is advantageously suitable for mass production. For example, waveguides or waveguide structures manufacture on the basis of an ion exchange method.

Figure 6:
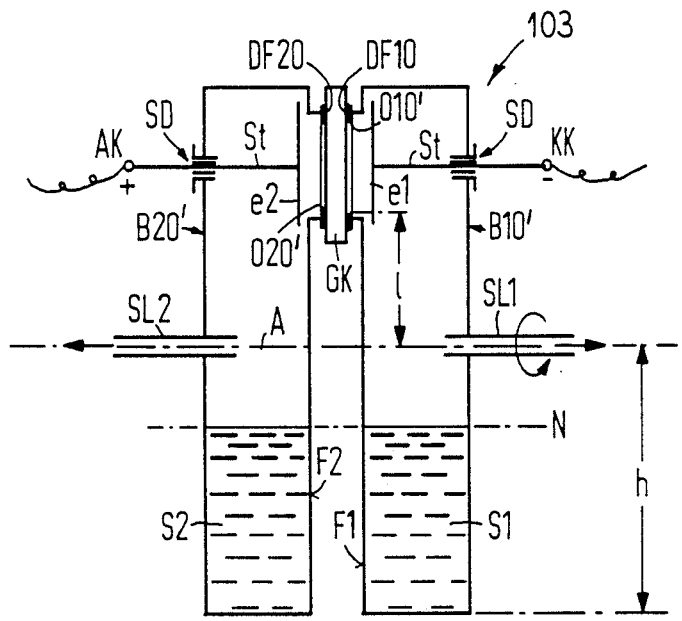
FIG. 6 is a schematic illustration of yet another embodiment of the salt melt vessels of the present invention which are mounted for rotation on a horizontal axis and are positioned so that the salt, during the melting in each of the vessels, is out of contact with the glass member to be treated.
Figure 7:
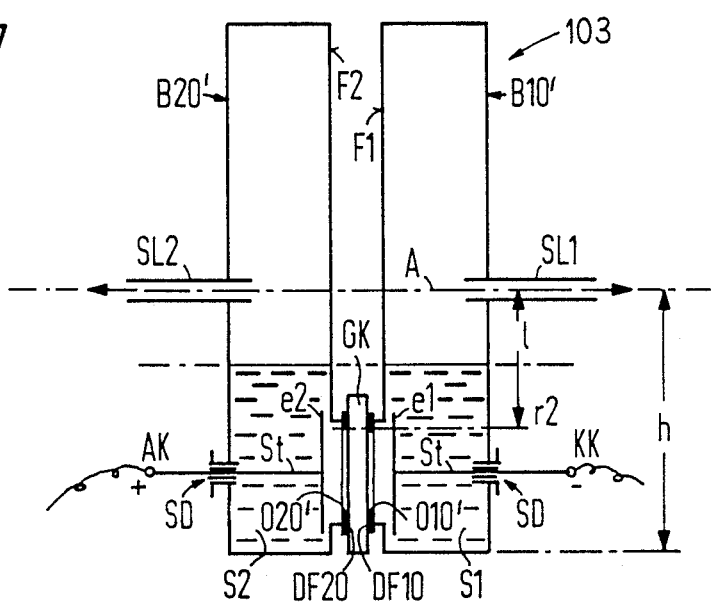
FIG. 7 is a schematic illustration of the embodiment of FIG. 6, with the vessel being rotated to contact the glass member with the melted salts in each vessel.

An embodiment of the fourth arrangement is generally indicated at 103 in FIGS. 6 and 7 and also provides the advantage of the embodiment of the arrangement 102. The arrangement 103 essentially differs from the arrangement of 102 in that the two salt melt vessels B10' and B20' can be rotated —for example through 180°—around a horizontal rotational axis A, that passes through the midpoint of each vessel, between an erect working position shown in FIG. 7 into an upside-down position shown in FIG. 6. In addition, an upper edge of each of the contact openings 010' and 020' of the salt melt vessels B10' and B20' are arranged at a distance 1 from the axis A, which has a height h from each end of each vessel B10' and B20'. The level N of the salt melts S1 and S2 in the salt vessels B10' and B20' is set so that it lies at least at a height of h−1 and, at the most, by a height slightly less than h when in the working position.

In the position of FIG. 6, the salt melt vessels B10' and B20' are filled with the solid salts and have a suction applied to draw the glass member GK firmly against the sealing surfaces DF10 and DF20. After the salt melts S1 and S2 have been produced by heating the solid salts and when the prescribed temperature for the field-promoted ion exchange process has been reached, the arrangement 103 is then rotated through 180° to the working position illustrated in FIG. 7. As a result thereof, both sides of the glass member GK simultaneously come into contact with the salt melts as in the previous arrangement 102 of FIGS. 4 and 5. Whereupon the field assisted ion exchange process can begin without having been preceded by any undersired, thermic ion exchange.

The above-defined setting of the level N assures that the contact openings 010' and 020' in the working position are entirely immersed in the salt melt, whereas they are not in contact with the salt melt in the position of FIG. 6. In addition, the electrodes e1 and e2 need not be fashioned as large volume, dipped electrodes, as in the arrangement 102 of FIGS. 4 and 5. The electrodes e1 and e2 can also be arranged horizontally displaceable, as shown in FIGS. 6 and 7. The horizontal displaceable electrodes are also favorable for this arrangement. Like the vertically displaceable electrodes, the horizontally displaceable electrodes e1 and e2 can also be connected to the contacts AK and KK by horizontal, movable metal rods St, whereas the rods project into the interior of the salt melt vessels B10' and B20' through vacuum-tight sliding lead-throughs SD. The suction lines SL1 and SL2 are advantageously arranged coaxially with the rotational axis A.

The salt containers, particularly the salt containers comprising the shut-off elements in the arrangement of 101 of FIGS. 2 and 3 can also be employed in the arrangement 102 of FIGS. 4 and 5.

In all of the embodiments shown and set forth above, the sliding lead-through SD formed both the electrical as well as mechanical lead-throughs. However, electrical and mechanical lead-throughs could also be realized separately from one another.

Althrough various minor modifications may be suggested by those versed in the art, it should be understood that I wish to embody within the scope of the patent granted hereon all such modifications as reasonably and properly come within the scope of my contribution to the art.

I claim:

1. In a method for a field-assisted ion exchange with anodic and cathodic contacting with a molten salt melt comprising the step of providing an arrangement including two vessels, each of said vessels having a contact opening with a sealing rim for engaging opposite surfaces of a glass member to be treated, means for changing the level of the molten salt in each vessel from a level removed from the contact opening to a level covering the entire contact opening of each vessel, and means for applying a vacuum to the interior of each vessel, lowering the level of the molten salts to not cover the openings, positioning a glass member between the two openings, creating a vacuum in each vessel to form a seal with the sealing rim of each opening, then raising the level of the molten salts to cover the openings, treating the members by conducting the ion exchange, then at the completion of treating the members by the ion exchange lowering the level, removing the treated member, positioning a second member and repeating the process of creating a vacuum, raising the level of the molten salt in each vessel and treating the member by conducting a field-assisted ion exchange with a cathodic and anodic contacting.

* * * * *